(12) United States Patent
Lee et al.

(10) Patent No.: US 7,836,096 B2
(45) Date of Patent: Nov. 16, 2010

(54) METHOD AND SYSTEM USING DATE/TIME MUTATION TO RETURN DATA TO JAVA APPLICATIONS

(75) Inventors: Bilung Lee, Fremont, CA (US); Paul A. Ostler, San Francisco, CA (US); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 11/611,025

(22) Filed: Dec. 14, 2006

(65) Prior Publication Data
US 2008/0147594 A1 Jun. 19, 2008

(51) Int. Cl.
*G06F 17/30* (2006.01)
(52) U.S. Cl. .................................................... 707/803
(58) Field of Classification Search .......... 707/999.101, 707/999.102, 999.103, 802, 803
See application file for complete search history.

(56) References Cited

U.S. PATENT DOCUMENTS

| | | | | |
|---|---|---|---|---|
| 5,566,329 | A * | 10/1996 | Gainer et al. ....................... | 1/1 |
| 5,857,182 | A * | 1/1999 | DeMichiel et al. ................. | 1/1 |
| 6,088,510 | A * | 7/2000 | Sims ............................ | 706/13 |
| 6,189,004 | B1 | 2/2001 | Rassen et al. | |
| 6,341,281 | B1 * | 1/2002 | MacNicol et al. .................. | 1/1 |
| 6,438,560 | B1 * | 8/2002 | Loen ................................ | 1/1 |
| 6,591,272 | B1 | 7/2003 | Williams | |
| 6,633,862 | B2 | 10/2003 | Thompson | |
| 6,816,868 | B1 | 11/2004 | Shimizu | |
| 6,847,971 | B1 | 1/2005 | Balaraman et al. | |
| 7,571,175 | B2 * | 8/2009 | Goetz ............................. | 1/1 |
| 7,571,432 | B2 * | 8/2009 | Heishi et al. ................ | 717/151 |
| 2004/0006549 | A1 * | 1/2004 | Mullins et al. ................ | 707/1 |
| 2004/0059706 | A1 | 3/2004 | Abelite | |
| 2004/0073565 | A1 | 4/2004 | Kaufman et al. | |
| 2004/0230555 | A1 | 11/2004 | Phenix et al. | |
| 2005/0050039 | A1 | 3/2005 | Theobald et al. | |

FOREIGN PATENT DOCUMENTS

WO 0135209 A2 5/2001

* cited by examiner

*Primary Examiner*—James Trujillo
*Assistant Examiner*—Jorge A Casanova
(74) *Attorney, Agent, or Firm*—Sawyer Law Group, P.C.

(57) ABSTRACT

The present invention provides a method, computer program product and article for creating and reusing a value object for data that is requested a first time and again in subsequent data requests in related result sets. Mutation directives and an associated methodology are presented in one of four different levels which permit the present invention to operate within the JDBC standard.

20 Claims, 4 Drawing Sheets

METHOD AND SYSTEM USING DATE/TIME MUTATION TO RETURN DATA TO JAVA APPLICATIONS

FIELD OF THE INVENTION

The present invention relates generally to computer-based applications and more specifically to a method for creating and reusing a value object for data that is a requested a first time and again in subsequent data requests in related result sets.

BACKGROUND OF THE INVENTION

The use of stale or dated data in various database systems can be problematic for certain users and for certain types of data. These problems can arise especially in time-sensitive applications involving information concerning pricing or availability. It is known that time-to-live, or TTL, caching systems provide limited solutions in certain circumstances for applications that may permit the use of data that is "slightly" stale, but these caching systems are not robust even in systems where even "slightly" stale data is permitted as the cached information will appear stale to an end user. Conveying even a "slightly" stale appearance can cause a loss of integrity with or confidence from the user.

Therefore, it is desirable to have the objects that are intended to be cached, such as information containing time-sensitive data (i.e., time, date, timestamp types of objects), remain up to date and not be displayed to the user in a "stale" format or mode.

For instance, when a Java application retrieves data from a date, time, and/or timestamp column, in a relational database (RDB) via Java Database Connectivity (JDBC) or Structured Query Language embedded in Java (SQLJ), a date, time, and/or timestamp Java object needs to be created for each value that is returned as part of the retrieval. Similarly, where Java applications retrieve data from date, time, timestamp columns in an RDB through a database driver, a Java object also needs to be created.

Unfortunately, the creation of Java objects (i.e., their instantiation), is time consuming and affects overall system performance particularly given a need to undertake numerous instantiation at any time. For example, a single Java object creation may require thousands of nanoseconds on a 200 MHz machine. Additionally, the date, time, timestamp constructor method requires extensive overhead resources to create and initialize underlying calendar and timezone structures in the objects, and it serializes on Time Zone methods, which prevent the scaling of applications processing in a high workload environments. Similarly, there is no database driver known to have successfully addressed these existing problems.

By example, in a web-based environment that may involve the web-sale of music compact discs (CDs), consumers visit a website and search for CDs of interest. As part of this search, consumers typically seek CD titles, associated pricing, and may ultimately make purchases of selected CDs. In providing the consumer with the web-information based on their search criteria, an application is called that will typically load general information about the CD (i.e., cover picture, item description, price, availability, comments, etc.) from the associated database. Once the general information is loaded, the application creates one or more objects (CD objects) to store the general information from one or more JDBC (Java Database Connectivity) result sets. After storing, the application may then render the CD objects as HTML and deliver the findings to the consumer's browser for display to the consumer. Typically, after the search findings are provided to the consumer, the application finalizes the consumer's request by allowing the Java Virtual Machine (JVM) to "garbage-collect" the created and complex CD objects for disposal. The JVM is typically a software "execution engine" in a browser, application or Oracle database that runs compiled java byte code (in class files). In operation, the above then occurs for each inquiry from each consumer even where the same search is conducted for a particular set of music characteristics (e.g., Rolling Stones CD). As a result, created objects are then churned and destroyed which is problematic for systems having moderate to high demand loads. Similarly, additional problems may results such as performance degradation if the CD objects are large and complex, thereby requiring multiple JDBC calls and often complex calculations.

FIG. 1 is a pictorial representation of the scenario in which there are n users conducting n searches. In the scenario 100, a database 110 stores resident information that may be searched on by numerous users (120, 130, 140 and 150) of the system. User 1, at 120, is a first requestor of information of the database 110 via a request for a search of information at 159. The application 160, which is common to all requestors in the scenario, has a low utilization based on the first request.

The utilization of the application is exemplified by a utilization box (155a, 155b, 155n) which is intended to be a depiction of real-time application utilization in view of user demands on the application. The utilization amount is indicated by a darkened region (161, 171, 181) within its associated utilization box in relation to the additional burden on the utilization of the application set forth by additional user requests.

The application 160, having received the first request 159 from user 120, searches for information at 162 within the database 110, and receives associated information on provided search characteristics at 163. The application 160 then loads the associated information received from 163. After loading the associated information, the application 160 creates objects (i.e., data objects) in view of the information sought and delivers the objects via 164 to the user 120. In performing this process, the application 160 has been utilized less than 100% of its capacity as is indicated by the partially shaded region of 161 of utilization box 155a.

A second user 130, in the scenario, has a similar request of the same application 160 and undergoes a similar process of utilizing the application, searching the database, receiving associated information creating a data object and providing the data object created back to the user, as described previously. In concurrently or serially supporting multiple user requests, the application 160 is additionally burdened by the second user 130 request and demands for object creation, as is indicated by the larger utilization demands of the darkened area at 171 versus 161. The application 160 is utilized more at this stage of the scenario as is shown by the larger darkened area of 171, of utilization box 155b, versus the smaller darkened region of 161. This burden increases as demands on the application from additional users at 140 and additional complexity of requests rises. Users at 140 are those which are in addition to users at 120 and 130 but just prior to those who cause the application to reach maximum utilization at 150.

In the scenario, when an "n[th]" user 150 seeks to also perform a search request of the application 160 in accordance with a similar process previously described, the nth user is unable to have the application 160 accommodate the request due to the demands on the system from prior and concurrent users (120, 130, 140), as indicated by the darkened region at 181, of utilization box 155n, which indicates 100% utilization of the application. As a result, no object will be created for the user, at 190, as no search associated information searches have been received nor requested.

Accordingly, what is desired is a method to overcome the limitations of the present art and be able to create a value object for data that is requested a first time and then use that created value object for subsequent requests of similar data in associated result sets. The present invention addresses such a need.

SUMMARY OF THE INVENTION

The present invention fulfills these needs and has been developed in response to the present state of the art, and in particular, in response to the problems and needs in the art that have not yet been fully solved by currently available database drivers, language protocols and related technologies.

The present invention sets forth a method, computer program product and article for creating and reusing a value object for data, also known as a data object, that is requested a first time and again in subsequent data requests in related result sets. The present invention provides for establishing a mutation directive with an associated value, inheriting the mutation directive into one or more mutation levels in a predetermined sequence, receiving a result set in response to an information query, determining a data object for a column of said result set for one or more of a specific date, time, or timestamp in relation to the mutation directive value, returning the determined data object and closing each of the one or more mutation levels.

DETAILED DESCRIPTION

Figure 1:
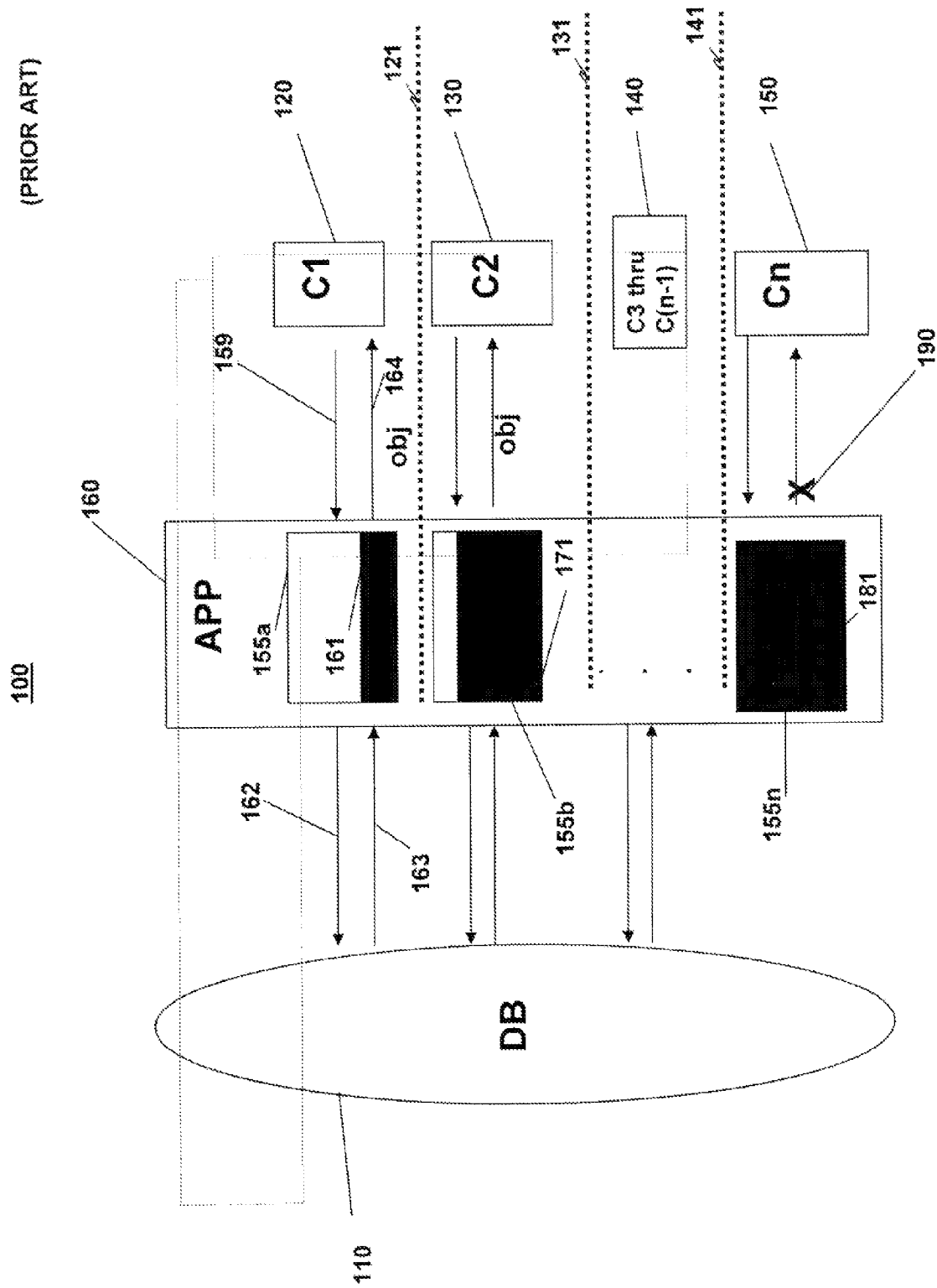
FIG. 1 is a pictorial representation of the scenario in which there are n users conducting n searches.

The present invention relates generally to computer-based applications and more specifically to a method for creating and reusing a value object for data that is requested a first time and again in subsequent data requests in related result sets. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In one embodiment of the present invention, a method for creating and reusing a value object for data, also known as a data object, that is requested a first time and again in subsequent data requests in related result sets, is provided for. The present invention provides for establishing a mutation directive with an associated value, inheriting the mutation directive into one or more mutation levels in a predetermined sequence, receiving a result set in response to an information query, determining a data object for a column of said result set for one or more of a specific date, time, or timestamp in relation to the mutation directive value, returning the determined data object and closing each of the one or more mutation levels.

In another embodiment, the present invention is a method for creating and reusing a value object for select data using a mutation directive comprising: setting a mutation directive, obtaining a connection from a data source, inheriting the mutation directive into the connection creating a statement from the connection, inheriting the mutation directive from the connection into the statement, receiving a result set from the statement as a result of a query, inheriting the mutation directive from the statement into the result set, identifying active status of said mutation statement in said result set in relation to said mutation directive, positioning result set in a predetermined row in relation to said identifying active status step, requesting a data object from a column of one or more of a specific date, time, or timestamp in the predetermined row of the result set in relation to said positioning step, retrieving said data object in relation to said identifying step, returning said data object, closing said result set, closing said statement and closing said connection.

In another embodiment of the present invention a computer program product is provided.

In a further embodiment of the invention an article comprising a machine-readable storage medium is provided.

The method of the present invention sets enables the creation of data objects (i.e., value objects) when returning a first row of data back to the application in use, such that the objects may be reused in subsequent data requests in related result sets. In part, the present invention sets forth a mutation directive (e.g., dateTimeMutation) to set whether the database driver, or an equivalent thereof, can or cannot recycle/mutate the date, time, timestamp object.

In operation, as all subsequent rows having common columnar characterstics are aligned, these subsequent tows can reuse the originally created value objects instead of constructing a new object each time using the present invention. The method of the present invention provides significant performance improvements for Java applications, retrieving Date/Time and Timestamp columns from a database, and additionally, overcomes the limitations of serialization.

In a preferred embodiment, the present invention provides a method for creating and reusing a value object (time, data, timestamp) for data that is requested a first time and again in subsequent data requests in related result sets. In the preferred embodiment, when data is requested to be returned back to the application, a date, time, or timestamp object is created when the data is requested during the first occurrence for a specific column of a given result set. All subsequent data requests on the same column of the result set may be recycled and mutated such that the previous constructed object may be used instead of creating a new object for the subsequent request. Therefore, under the present invention, a value object is created only once per column in the given result set resulting in the ability to use a traditional array structure to cache the data object. Under the present invention, there is no requirement for a complex object pooling mechanism. It will be understood by those in the field, that recycling and mutating a date, time, or timestamp object consumes less CPU than constructing an equivalent new object for each request received.

In an embodiment of the present invention, the data objects are created when the first row for a given cursor, for example, is returned where those objects are also cached. Upon a subsequent returning to the next row of the application (i.e., Java application), typically resulting from a request for similar data, the Date/Time/Timestamp objects of the cursor are reused and mutated in response to the subsequent request. Contradistinctively, since the JDBC standard allows the reference of an object that was retrieved from a database at most any time, reusing the Date/Time and Timestamp object would typically be invalid in accordance with the standard behavior permitted under the JDBC standard. However, the present invention accounts for such an issue as is further described below.

In one instance, in the present invention, the mutation directive is implemented to inform the JDBC driver that the application does not keep references to previously retrieved columns in the application and that the database driver can recycle and mutate the date, time, and timestamp object. In an alternate instance, where the application expects standard behavior under the JDBC standard, the Date/Time/Timestamp object is always created before returning the object to the application as the database driver will not recycle or mutate the date, time and timestamp object. It will be appreciated by those in the field that mutating/cloning a Date/Time/Timestamp object consumes less CPU than constructing an equivalent new object and does not further frustrate serialization issues.

Figure 2:
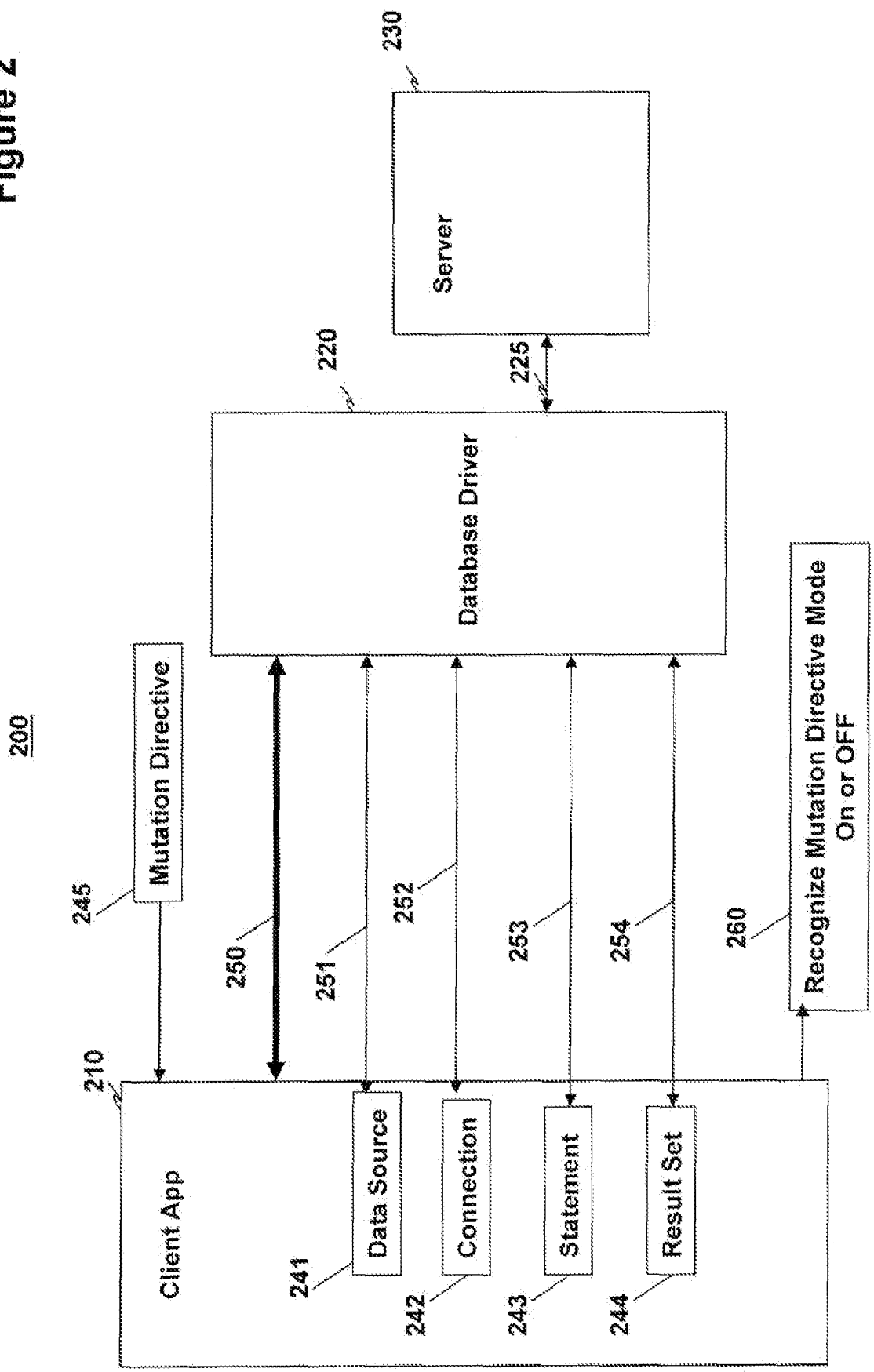
FIG. 2 is a schematic representation of the operation of the present invention.

FIG. 2 is a schematic representation of the operation of the present invention in a preferred embodiment.

In FIG. 2, a client application 210 is in bidirectional communication at 250 with a database driver 220 which is in bidirectional communication at 225 with a server 230. A server, as used herein, may be any computing device and is not limited to a device having a specific number of processors or processing capacity. Within the application 210, there exist for the present invention four levels of mutation opportunity: data source 241, connection 242, statement 243 and result set 244. The mutation directive 245 may be set, under the present invention, in any of or any combination of the four levels of mutation opportunity in accordance with one or more preferred embodiments of the present invention, such that the application is able to determine whether the database driver, or an equivalent thereof, can or cannot recycle/mutate the date, time, timestamp object. In one aspect of the present embodiment, the mutation directive is implemented to inform the JDBC driver that the application does not keep references to previously retrieved columns in the application and that the database driver can recycle and mutate the date, time, and timestamp object. In an alternate aspect of the present embodiment, where the application expects standard behavior under the JDBC standard, the Date/Time/Timestamp object is always created before returning the object to the application as the database driver will not recycle or mutate the date, time, and timestamp object.

From FIG. 2, optionally, the mutation directive may be set in any of or any combination of the four different levels 241, 242, 243 or 244. After which, a connection 242 is obtained from the data source 241. In the event the mutation directive was first set in the data source 241, its value may now be inherited to the connection 242 if the mutation directive in the connection 242 is not set. In an alternative embodiment, where the mutation directive was set in the connection its value may be overwritten from the value of the data source if the data source was set.

Although this embodiment is described with the mutation directive value being overwritten from the value of the data source, one of ordinary skill in the art readily recognizes that the converse could be performed and that would be within the spirit and scope of the present invention.

A statement 243 is then created from the connection 242. The mutation directive is then inherited from the connection into the statement if the mutation directive in the statement is not set. Otherwise, the previously identified override semantics will be performed if the mutation directive is set. A result set 244 is provided from the statement as a result of a query of a consumer or other user (not shown). In a further alternate embodiment, where the mutation directive is set in the result set, its value may be overwritten by or inherited from the value in the statement depending upon whether the mutation directive in the statement is set or not.

The mutation directive may be in one of two modes (i.e. active status), ON or OFF as is recognized by the application from the directive at 260. In an ON mode, the mutation directive is set such that a database driver 220 can recycle and mutate the date, time and timestamp objects. In an ON state, the application 210 is not able to keep references to previously retrieved columns. In an OFF mode, the mutation directive is set such that the JDBC standard is expected and the database driver 220 is instructed not to recycle and mutate the date, time and timestamp objects.

Where the mutation directive is turned ON, an array is allocated in relation to the size of the number of columns in the result set 244. Thereafter, the result set may be positioned at a certain row, predetermined, and a data request from a specific date, time, timestamp column in the certain row of the result set occurs. The data object is retrieved from the array cache at the requested column position and the data object is thereafter mutated in relation to the appropriate value received from the data source. This can continue to occur for subsequent requests under the present invention. The amended or mutated data object is then returned.

Where the mutation directive is turned OFF in the result set or where there is no data objected stored in the array at the position corresponding to the requested column, a new data object is required to be created. The data object is then created in relation to the appropriate value received from the data source. The data object is then returned.

Under the present invention, the result set is then closed, the statement is closed and the connection is closed.

In operation, when subsequent data is requested on the same column (but not necessarily on the same row as before), a date, time, or timestamp object may be recycled and mutated from the corresponding position of the array cache.

Figure 3:
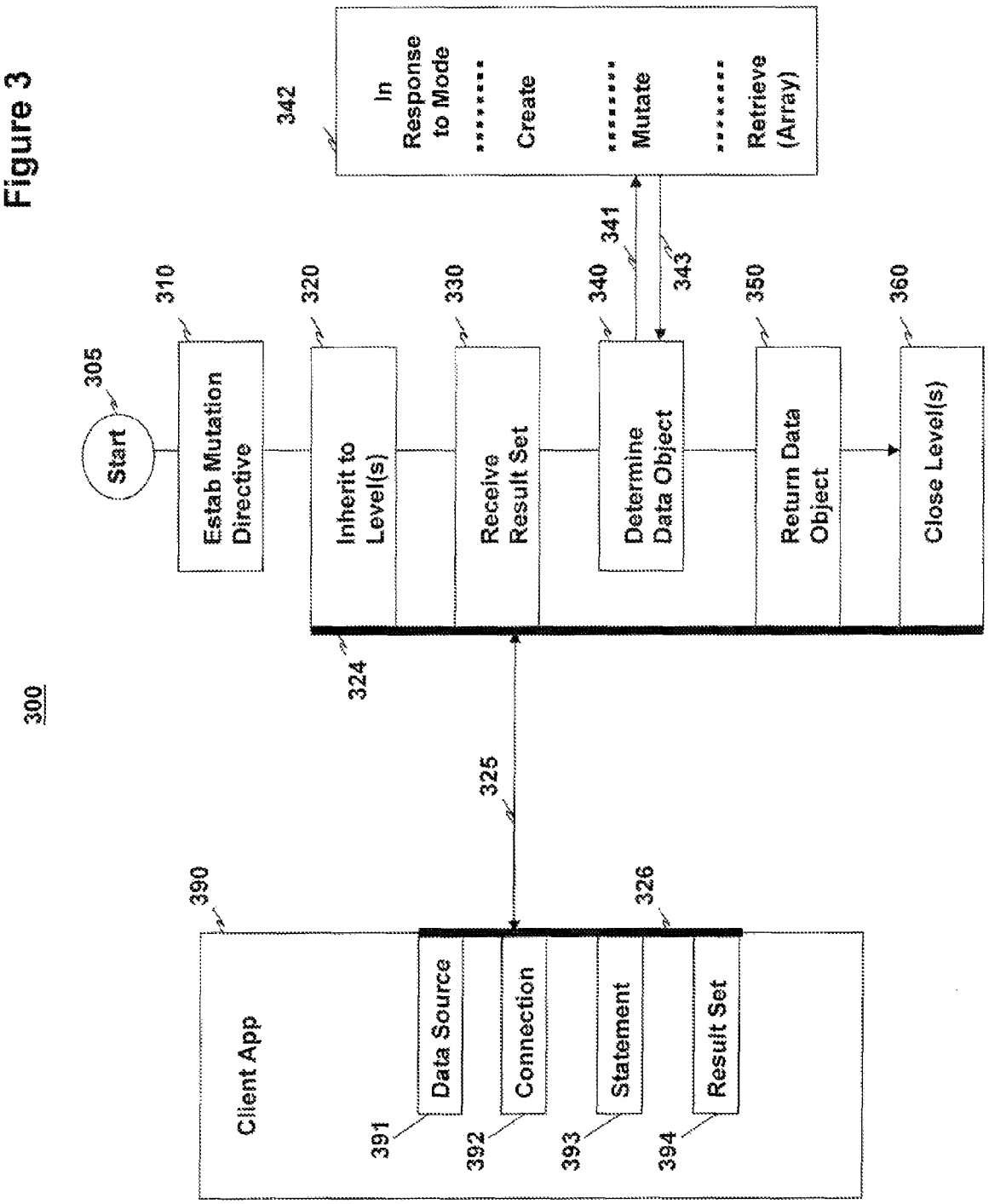
FIG. 3 is a flowchart in relation to an application in a preferred embodiment of the present invention.

FIG. 3 is a flowchart in relation to an application in a preferred embodiment of the present invention. From FIG. 3, the present invention, in a preferred embodiment, sets forth a method 300 for creating and reusing a data object for data that is requested a first time and again in subsequent data requests in related result sets. The method begins at 305 and establishes a mutation directive with an associated value at 310. The associated value may be in relation to the mode or state of the mutation directive whereby it is accepting or not accepting of the JDBC standard and thereby permitting or not permitting of a database driver's ability to recycle and mutate with respect to the date, time and timestamp objects. The mutation directive, inclusive of its value, is then inherited into one or more mutation levels in a predetermined sequence, where the mutation levels may be those found in the client application 390 of data source 391, connection 392, statement 393 and result set 394. Communication and logical relationships are pictorially demonstrated in FIG. 3 by the relational connectivity of 325 as between certain steps of the method at 324 and the levels of the application 390 along 326. The manner in which the mutation directive may be inherited in the one or more mutation levels his inclusive of that described herein and throughout.

From FIG. 3, a result set is then received at 330 in response to an information query (not shown) and a data object is then determined for a column of the received result set for one or more of a specific date, time, or timestamp in relation to the mutation directive value, at 340. The manner in which the step of determining the data object occurs is logically associated, at 341, 343, is in relation to the mode of the mutation directive and the availability of a data object in the result set, at 342. In relation to the mutation directive mode and the availability of a data object in the result set, the data object may be either created, mutated or retrieved at 342. Once determined, the data object is returned at 350, and, optionally, may be cached in array (not shown). The levels are then closed in the present invention at 360.

Figure 4:
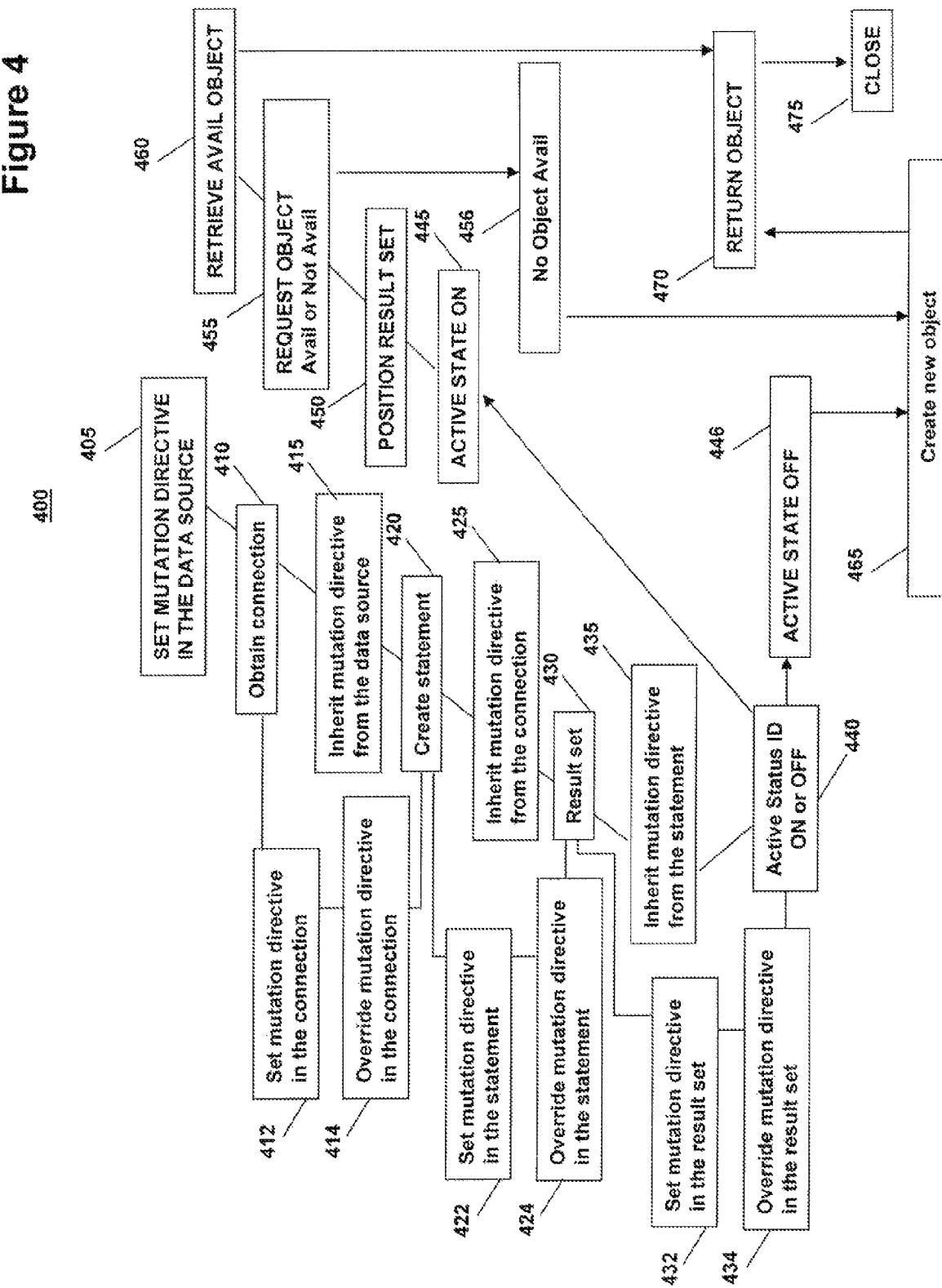
FIG. 4 is a flowchart of a process in a preferred embodiment of the present invention.

FIG. 4 is a flowchart of a process of the present invention in a preferred embodiment. In FIG. 4, a preferred method 400 for creating and reusing a value object for select data using a mutation directive is set forth.

From FIG. 4, a mutation directive is set at the data source at 405 and a connection is obtained from a data source at 410. The mutation directive, including its value, can, for example then be inherited into the connection at 415 and a statement is created from the connection at 420. In the alternative, the user can set the mutation directive in the connection at 412 and the mutation directive is overridden in the connection at 414. Thereafter, the statement is created from the connection at 420.

The mutation directive can, for example then be inherited from the connection into the statement at 425 and a result set is received from the statement as a result of a query (not shown) at 430. In the alternative, the user can set the mutation directive in the statement at 422 and the mutation directive is overridden in the statement at 424. Thereafter, the result set is created from the statement at 430.

The mutation directive from the statement call then be inherited into the result set at 435 and the active status of the mutation statement in the result set is determined in relation to the mutation directive value as ON or OFF at 440. In the alternative, the user can set the mutation directive in the result set at 432 and the mutation directive is overridden in the result set at 434. Thereafter, the active status of the mutation in the result set is determined in relation to mutation directive value as ON or OFF at 440.

If the mutation directive active state (i.e., mode) is ON at 445, the result set is positioned in a predetermined row at 450, a data object is requested from a column of one or more of a specific date, time, or timestamp in the predetermined row of the result set at 455 and the data object is retrieved from an array at 460, if the data object is available in the array. If the active state is OFF at 446, or if there is no data object stored in the array of 455, a new data object is created in relation to the value received from data source at 465.

A data object having a mutated value is then returned from 460 to 470 or the created data object is returned from 465 to 470, and the closing of the result set, the statement and the connection occurs at 475.

Accordingly, the present invention sets forth a method to overcome the limitations of the present art and be able to create a value object for data that is requested a first time and then use that created value object for subsequent requests of similar data in associated result sets.

As used herein, the terms "date, time, timestamp"; "date/time/timestamp"; "Date/Time/Timestamp"; are intended to be used interchangeably, individually or jointly, and are recognized by the present invention and those of skill in the art as being mutable objects. As used herein the term "mutable object" is defined to be an object that may be changed or modified after its initial creation, whereas an "immutable object" is defined to be an object that cannot be modified following its initial creation.

As used here, the terms "data object" and "value object" are intended to be used interchangeably, as are the terms "mutation directive" and "value" when associated with respect to the mutation directive such that a directive is not limited to a set command but may also be inclusive of a mode or value.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for creating a data object in response to data requested on a first instance and reusing said created data object in a subsequent request, comprising:
    establishing a mutation directive with an associated value;
    inheriting said mutation directive into one or more mutation levels in a predetermined sequence, receiving a result set in response to an information query, wherein said step of inheriting occurs sequentially in a predetermined manner by inheriting said value of said mutation directive first into a data source, second into a connection, third into a statement, and fourth into a result set;
    determining a data object for a column of said result set for one or more of a specific date, time, or timestamp in relation to said mutation directive value, returning said determined data object; and
    closing each of said one or more mutation levels.

2. The method of claim 1, wherein said step of determining includes one of creating, mutating or retrieving said data object in relation to active state of said mutation directive.

3. The method of claim 2, wherein said active state is one of either ON or OFF.

4. The method of claim 3, wherein said value of said mutation directive is set to permit a database command sequence to recycle/mutate said data object.

5. The method of claim 4, wherein said database command sequence is a database driver and said data object is one of a date/time/timestamp data object.

6. The method of claim 3, wherein said value of said mutation directive is set to not permit a database command sequence to recycle/mutate said data object.

7. The method of claim 6, wherein said database command sequence is a database driver and said data object is one of a date/time/timestamp data object.

8. The method of claim 1, further comprising the step of creating an array for said data object wherein said array is of a dimension in relation to a number of columns in said result set.

9. The method of claim 8, wherein said data object for a column is limited to one of a specific date, time, or timestamp in the predetermined row of the result set in relation to said result set.

10. The method of claim 1, wherein the mutation directive is set in any of and any combination of the data source, the connection, the statement and the result set.

11. The method of claim 10, wherein said mutation directive is set a value of OFF and the step of determining a data object includes creating said data.

12. The method of claim 10, wherein said mutation directive is set a value of ON.

13. The method of claim 12, wherein said data object is created only once per column in said result set.

14. The method of claim 13, wherein an array is used to cache said data object.

15. A computer program product stored on a computer usable medium comprising:
- computer readable program code for causing a computer to control an execution of an application, the computer program product including program instructions for creating and reusing a value object for select data using a mutation directive comprising:
- establishing a mutation directive with an associated value;
- inheriting said mutation directive into one or more mutation levels in a predetermined sequence, wherein said step of inheriting occurs sequentially in a predetermined manner by inheriting said value of said mutation directive first into a data source, second into a connection, third into a statement, and fourth into a result set,
- receiving a result set in response to an information query;
- determining a data object for a column of said result set for one or more of a specific date, time, or timestamp in relation to said mutation directive value;
- returning said determined data object; and closing each of said one or more mutation levels.

16. An article comprising: a machine-readable storage medium having a plurality of machine accessible instructions, which if executed by a machine, cause the machine to perform operations comprising:
- establishing a mutation directive with an associated value,
- inheriting said mutation directive into one or more mutation levels in a predetermined sequence, wherein said step of inheriting occurs sequentially in a predetermined manner by inheriting said value of said mutation directive first into a data source, second into a connection, third into a statement, and fourth into a result set,
- receiving a result set in response to an information query,
- determining a data object for a column of said result set for one or more of a specific date, time, or timestamp in relation to said mutation directive value,
- returning said determined data object and
- closing each of said one or more mutation levels,
- wherein said data object is one of a date/time/timestamp data object.

17. The article of claim 16, wherein said step of determining includes one of creating, mutating or retrieving said data object in relation to active state of said mutation directive.

18. The article of claim 17, wherein said active state is one of either ON or OFF.

19. The article of claim 16, further comprising the step of creating an array for said data object wherein said array is of a dimension in relation to a number of columns in said result set.

20. A method for creating and reusing a value object for select data using a mutation directive comprising:
- setting a mutation directive;
- obtaining a connection from a data source
- inheriting the mutation directive into the connection;
- creating a statement from the connection;
- inheriting the mutation directive from the connection into the statement;
- receiving a result set from the statement as a result of a query;
- inheriting the mutation directive from the statement into the result set;
- identifying active status of said mutation statement in said result set in relation to said mutation directive;
- positioning result set in a predetermined row in relation to said identifying active status step;
- requesting a data object from a column of one or more of a specific date, time, or timestamp in the predetermined row of the result set in relation to said positioning step;
- retrieving said data object in relation to said identifying step where if said identifying step is "ON" retrieving said data object from an array cached at predetermined column position, and mutating said data object in relation to value received from data source, or if said identifying step is "OFF" or if there is no data object stored in said array, creating a new data object in relation to value received from data source;
- returning said data object ;
- closing said result set;
- closing said statement; and
- closing said connection.

* * * * *